United States Patent
DeSanti

(10) Patent No.: US 9,445,547 B2
(45) Date of Patent: Sep. 20, 2016

(54) BLOWER APPARATUS

(71) Applicant: Michael J DeSanti, Hawley, PA (US)

(72) Inventor: Michael J DeSanti, Hawley, PA (US)

( * ) Notice: Subject to any disclaimer, the term of this patent is extended or adjusted under 35 U.S.C. 154(b) by 0 days.

(21) Appl. No.: 14/752,859

(22) Filed: Jun. 27, 2015

(65) Prior Publication Data
US 2015/0373921 A1 Dec. 31, 2015

Related U.S. Application Data

(60) Provisional application No. 62/018,535, filed on Jun. 28, 2014.

(51) Int. Cl.
*A01G 1/12* (2006.01)
*E01H 1/08* (2006.01)

(52) U.S. Cl.
CPC ............ *A01G 1/125* (2013.01); *E01H 1/0809* (2013.01)

(58) Field of Classification Search
CPC .. A01G 1/125; E01H 1/0809; E01H 1/0818; E01H 1/0863; E01H 2001/0881
USPC ...................... 15/327.5, 344, 405

IPC ........................................................ A01G 1/12
See application file for complete search history.

(56) References Cited

U.S. PATENT DOCUMENTS

| | | | | |
|---|---|---|---|---|
| 6,076,231 A | * | 6/2000 | Bucher | A01G 1/125 15/405 |
| 6,226,833 B1 | * | 5/2001 | Kawaguchi | A01G 1/125 15/330 |
| 6,843,639 B2 | * | 1/2005 | Schutt | F04D 29/462 15/416 |
| 9,057,166 B2 | * | 6/2015 | Prager | E01H 1/0809 |

* cited by examiner

*Primary Examiner* — David Redding
(74) *Attorney, Agent, or Firm* — Mestechkin Law Group P.C.

(57) ABSTRACT

A blower apparatus having an airflow diverting unit is described. The disclosed blower apparatus comprises a housing containing an airflow-generating means and an airflow discharge tube physically coupled with the housing. The airflow discharge tube has a first terminal end, a second terminal end, and an aperture protruding a portion of a side surface of the airflow discharge tube. The disclosed blower apparatus also comprises an airflow diverting unit attached to an outer surface of the airflow discharge tube.

7 Claims, 2 Drawing Sheets

BLOWER APPARATUS

RELATED APPLICATIONS

The present application claims the benefit of U.S. Provisional Patent Application No. 62/018,535, filed on Jun. 28, 2014, which is incorporated herein by reference in its entirety.

FIELD OF THE INVENTION

The present invention relates generally to an apparatus for landscaping and lawn maintenance.

BACKGROUND OF THE INVENTION

Portable blowers have been a useful addition to landscaping and lawn maintenance tools for professional landscapers and individual homeowners. While blowers offer many benefits, the users still have to spend prolonged periods of time outdoors often dealing with high air temperature and flying insects.

Accordingly, it is desirable to provide a blower apparatus that is designed to add comfort for a person using the blower.

SUMMARY OF THE INVENTION

The foregoing needs are met by the present invention, wherein the present invention is directed to a blower apparatus comprising an airflow diverting unit installed thereon.

In accordance with advantageous embodiment of the present invention, a blower apparatus comprises a housing containing an airflow generating means, wherein the housing is physically coupled to an airflow discharge tube, such that an airflow generated by the airflow generating means is directed into one terminal end of the airflow discharge tube and is discharged from the airflow discharge tube via one other terminal end—a nozzle—of the airflow discharge tube. The airflow discharge tube comprises an airflow diverting unit installed thereon to direct a portion of airflow in the direction other than the direction of the nozzle of the discharge tube.

DETAILED DESCRIPTION

Figure 1:
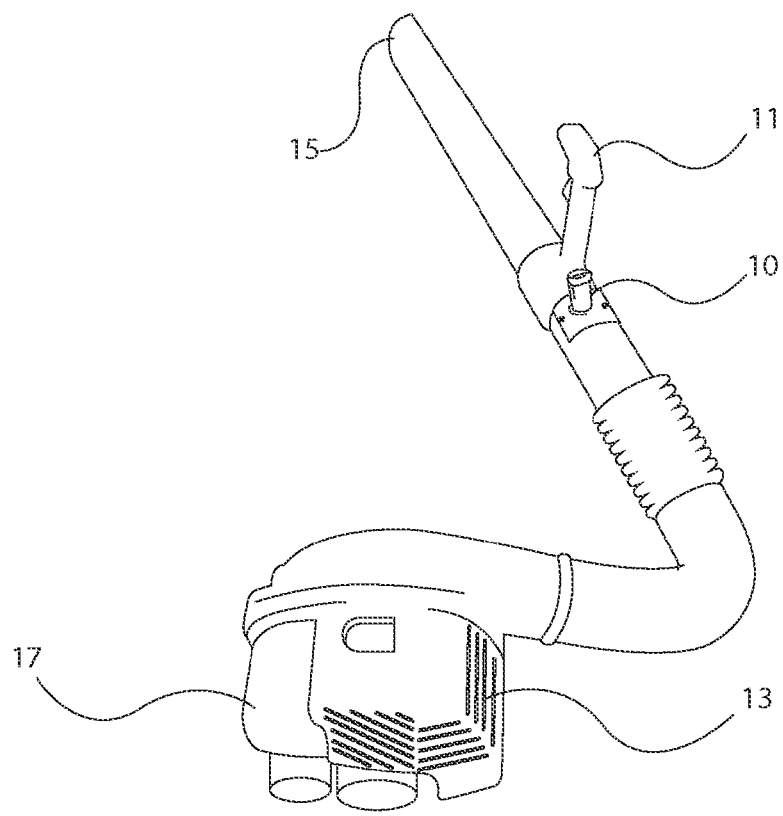
FIG. 1 is a perspective view illustrating a blower apparatus comprising an airflow discharge tube having the airflow diverting unit installed thereon in accordance with an embodiment of the invention.

FIG. 1 is a perspective view illustrating a blower apparatus comprising housing 17 and an airflow discharge tube 15 having an airflow diverting unit 10 installed thereon in accordance with an embodiment of the invention. Housing 17 encloses an airflow generating means 13, such as a motor, an engine, a fan, and the like. Housing 17 is physically coupled with the airflow discharge tube 15. The airflow discharge tube 15 comprises and can be formed from a lightweight material, such as a plastic or a composite material. It is to be understood that portions of the airflow discharge tube 15 are corrugated and flexible, such that a person using the blower apparatus disclosed herein can easily direct the airflow discharge tube 15 in various directions. The airflow discharge tube 15 comprises a control handle 11 which is mounted on an outer surface of the airflow discharge tube 15, such that the airflow discharge tube 15 can be easily be directed as desired by a person operating the blower apparatus. The airflow discharge tube 15 also comprises an airflow diverting unit 10 installed on the outer surface of the airflow discharge tube 15.

Figure 2:
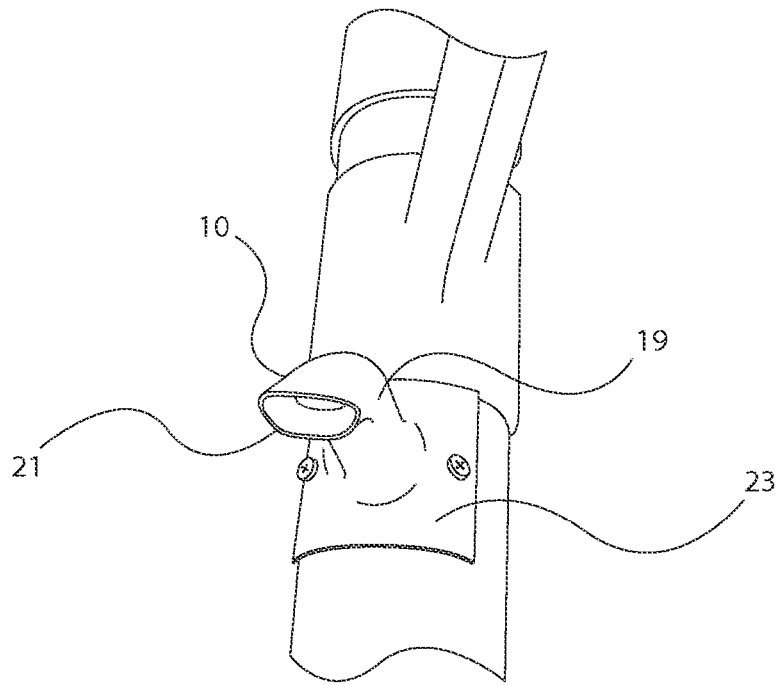
FIG. 2 is an exploded view of a portion of the airflow discharge tube having the airflow diverting unit installed thereon in accordance with an embodiment of the invention.

FIG. 2 is an exploded view of a portion of the airflow discharge tube 15 having the airflow diverting unit 10 installed thereon in accordance with an embodiment of the invention. As shown in an illustrative embodiment of FIG. 2, the airflow diverting unit 10 comprises an angular tube 19 which terminates at one end with a mounting flange 23 having an inlet aperture. The angular tube 19 terminates at other end with an outlet aperture 21. The airflow diverting unit 10 may be formed of a plastic material or any other suitable material. The airflow diverting unit 10 is physically coupled to the airflow discharge tube 15. The mounting flange 23 of the airflow diverting unit 10 is physically attached to an outer surface of the airflow discharge tube 15. It is to be understood that depending on a size of the mounting flange 23 of the airflow diverting unit 10, the mounting flange 23 can be flat or it can be of a curvature that is identical to the curvature of the outer surface of the airflow discharge tube 15.

In the illustrative embodiment presented on FIG. 2, the mounting flange 23 has the curvature that is identical to the curvature of the airflow discharge tube 15 and is attached to the outer surface of the airflow discharge tube 15 with two bolts. It is to be understood by a person skilled in the art that the airflow diverting unit 10 can be attached to the outer surface of the airflow discharge tube 15 by other suitable means, such as glue, slide-in railings, magnets, and the like. The airflow diverting unit 10 may also be a part of a ring-like insert within the airflow discharge tube 15 or a ring-like sleeve overlying the airflow discharge tube 15 where such insert or a sleeve rotates around central axis of the airflow discharge tube 15 to provide for additional directions of diverting the airflow or to regulate or restrict the airflow redirected by the airflow diverting unit 10. It is to be understood that the airflow diverting unit that include the ring-like insert or a sleeve does not require having a mounting flange 23 as the ring-like insert or a sleeve serve the purpose of attaching the airflow diverting unit to the airflow discharge tube 15.

In one embodiment, as illustrated in FIG. 2, the angular tube 19 of the airflow diverting unit 10 is statically attached to the mounting flange 23. In other embodiment, the angular tube 19 of the airflow diverting unit 10 is attached to the mounting flange 23 such that the angular tube 19 can be rotated along its vertical axes and/or Omni-directionally swiveled to change direction of an airflow diverted by the airflow diverting unit 10.

In one embodiment, as illustrated in FIG. 2, the outlet aperture 21 of the airflow diverting unit 10 has an oval geometrical shape. It is to be understood by a person skilled in the art that the outlet aperture 21 can be of any geometrical shape (e.g., circular, multi-angular, and the like).

Figure 3:
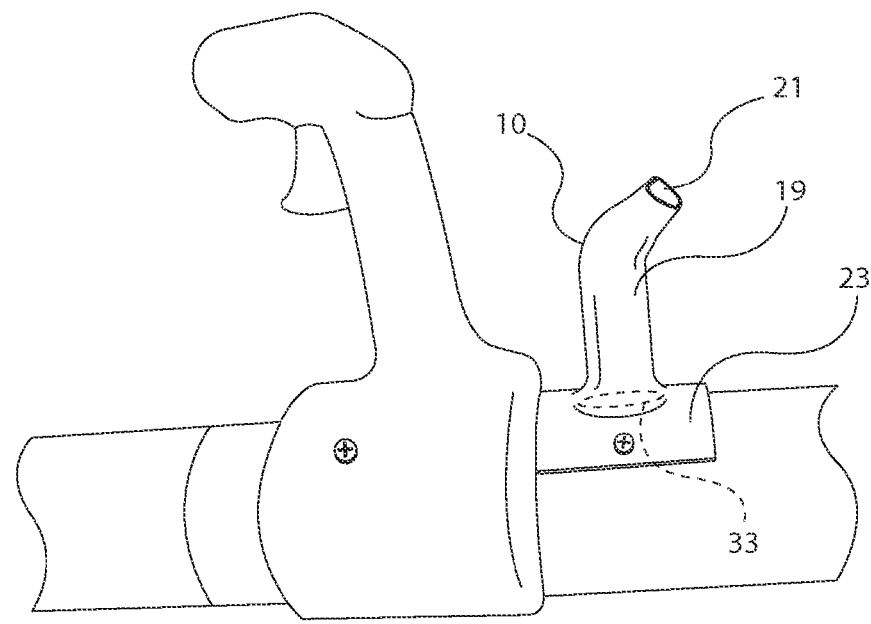
FIG. 3 is an exploded side view of a portion of the airflow discharge tube having the airflow diverting unit installed thereon in accordance with an embodiment of the invention.

FIG. 3 is an exploded side view of a portion of the airflow discharge tube having the airflow diverting unit 10 installed thereon in accordance with an embodiment of the invention. An illustrative embodiment of FIG. 3 shows the airflow diverting unit 10 comprising an angular tube 19 which terminates at one end with an inlet aperture 33 and the mounting flange 23. The angular tube 19 terminates at other end with an outlet aperture 21. The mounting flange 23 overlays an aperture (not shown) within the airflow discharge tube 15 such that the inlet aperture 33 of the airflow diverting unit 10 is aligned exactly with the aperture within the airflow discharge tube 15.

The exact alignment of the inlet aperture 33 of the airflow diverting unit 10 and the aperture within the airflow discharge tube 15 allows for a portion of the airflow propagating through the airflow discharge tube 15 to enter the airflow diverting unit 10 through the aperture within the airflow discharge tube 15 and through the aperture 33 of the mounting flange 23 of the airflow diverting unit 10. The portion of the airflow redirected by the airflow diverting unit 10 in the direction of the user of the blower apparatus is discharged from the outlet aperture 21 with thrust that is essentially equal to the thrust of the airflow being discharged through a nozzle of the airflow discharge tube 15, thereby providing the user of the blower apparatus with a heat-relieving air stream and preventing dust particles and flying insects to remain in close proximity to the user of the blower apparatus described herein.

Figure 4:
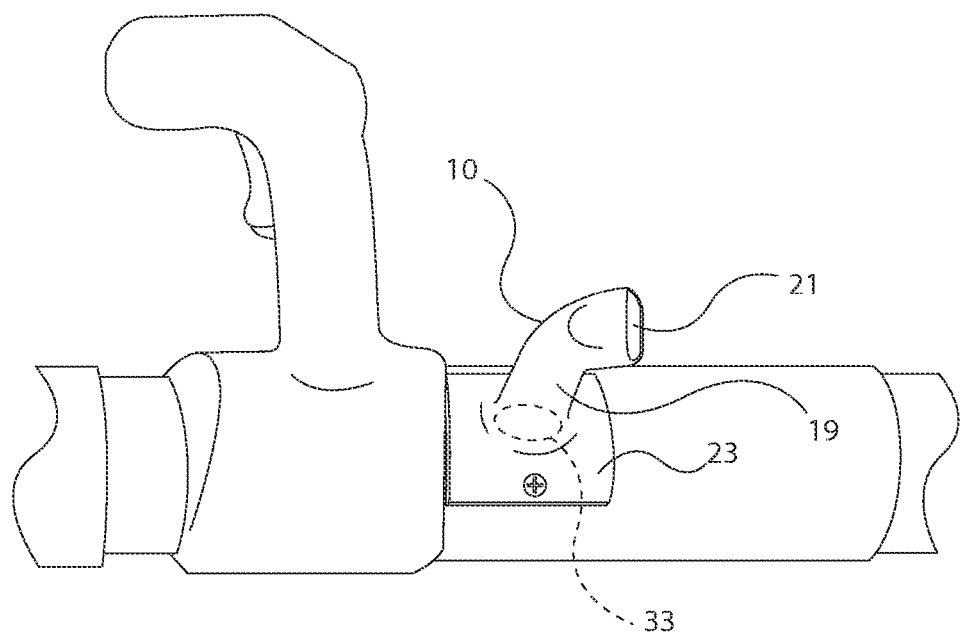
FIG. 4 is an exploded top view of a portion of the airflow discharge tube having the airflow diverting unit installed thereon in accordance with an embodiment of the invention.

FIG. 4 is an exploded top view of a portion of the airflow discharge tube having the airflow diverting unit 10 installed thereon in accordance with an embodiment of the invention. Similar to FIG. 3, an illustrative embodiment of FIG. 4 shows the airflow diverting unit 10 comprising the angular tube 19 which terminates at one end with the inlet aperture 33 and the mounting flange 23. The angular tube 19 terminates at other end with an outlet aperture 21. The mounting flange 23 overlays an aperture (not shown) within the airflow discharge tube 15 such that the inlet aperture 33 of the airflow diverting unit 10 is aligned exactly with the aperture within the airflow discharge tube 15.

The exact alignment of the inlet aperture 33 of the airflow diverting unit 10 and the aperture within the airflow discharge tube 15 allows for a portion of airflow propagating through the airflow discharge tube 15 to enter the airflow diverting unit 10 through the aperture within the airflow discharge tube 15 and through the aperture 33 of the mounting flange 23 of the airflow diverting unit 10. Although the inlet aperture 33 is shown to be of an oval geometrical shape, the inlet aperture 33 may have any geometrical shape (e.g., circular, multi-angular, and the like).

Although the aperture within the airflow discharge tube 15 is not shown, it is to be understood that the aperture may be of any geometrical shape, preferably having identical geometrical shape with geometrical shape of the inlet aperture 33 of the mounting flange 23 of the airflow diverting unit 10.

As it may not always needed or be desirable to have a portion of an airflow to be redirected, the airflow diverting unit 10 comprises an airflow control means, such as a removable/non-removable cap or an airflow-regulating valve controlling the airflow through the inlet aperture 33 or the outlet aperture 21. The airflow control means can provide for unrestricted airflow propagating through the airflow diverting unit 10 by keeping the inlet aperture 33 or outlet 21 fully open. Alternatively, the airflow control means can provide for restricted airflow through the airflow diverting unit 10 by keeping the inlet aperture 33 or outlet 21 partially closed or fully closed.

The many features and advantages of the invention are apparent from the detailed specification, and thus, it is intended by the appended claims to cover all such features and advantages of the invention which fall within the scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A blower apparatus, comprising:
   a housing containing a motor;
   an airflow discharge tube having a first terminal end, a second terminal end, and an aperture protruding a portion of a side surface of the airflow discharge tube, wherein the airflow discharge tube is physically coupled with the housing; and
   an airflow diverting unit comprising a mounting flange and an angular tube terminating at one end with an outlet aperture and terminating at one other end with an inlet aperture and the mounting flange, wherein the airflow diverting unit is physically attached to an outer surface of the airflow discharge tube and redirecting a portion of an airflow within the airflow discharge tube in a direction of a user of the blower apparatus.

2. The blower apparatus of claim 1, wherein the motor Generates the airflow directed into the first terminal end of the airflow discharge tube and discharged from the second terminal end of the airflow discharge tube.

3. The blower apparatus of claim 2, wherein the second terminal end of the airflow discharge tube is a nozzle.

4. The blower apparatus of claim 1 wherein the airflow diverting unit is physically attached to the outer surface of the airflow discharge tube by the mounting flange such that edges of the inlet aperture are aligned with edges of the aperture protruding a portion of a side surface of the airflow discharge tube, whereby enabling a portion of the airflow within the airflow discharge tube to be redirected to the airflow diverting unit from the airflow discharge tube in the direction of the user of the blower apparatus.

5. The blower apparatus of claim 1 wherein the airflow diverting unit further comprises a removable cap for the outlet aperture.

6. The blower apparatus of claim 1, wherein the airflow diverting unit further comprises an airflow-regulating valve.

7. The blower apparatus of claim 1, wherein the airflow discharge tube comprises a control handle attached thereon.

* * * * *